United States Patent [19]
Saidla

[11] 3,752,437
[45] Aug. 14, 1973

[54] MOLD CAPABLE OF BEING OPENED AND CLOSED

[75] Inventor: Glen W. Saidla, Wyomissing Hills, Pa.

[73] Assignee: Dana Corporation, Toledo, Ohio

[22] Filed: Dec. 2, 1971

[21] Appl. No.: 204,287

[52] U.S. Cl............... 249/172, 425/442, 425/450 C
[51] Int. Cl............................................ B41b 11/54
[58] Field of Search................. 249/170, 171, 172; 425/442, 450 C

[56] References Cited
UNITED STATES PATENTS

| | | | |
|---|---|---|---|
| 3,241,210 | 3/1966 | Shurtz | 249/172 X |
| 1,516,710 | 11/1924 | Caputo | 425/442 X |
| 1,770,368 | 6/1930 | Fahlman | 249/172 X |
| 3,132,403 | 5/1964 | Richards et al. | 249/170 X |
| 3,380,703 | 4/1968 | Zastrow | 249/172 |

*Primary Examiner*—H. A. Kilby, Jr.
*Attorney*—Harold D. Shall et al.

[57] ABSTRACT

A mold which is capable of being closed to form a peripherally enclosed cavity within the mold and is formed from a lower wall, a pair of side walls hinged to pivot with respect to the lower wall and a top wall hinged to pivot relative to one of the side walls. Because of the pivotal movement, the top and side walls, upon pivoting to an open position, move in a peeling manner with respect to an object formed therein, while the supporting means for the lower wall move the latter away from the formed object in a peeling manner.

6 Claims, 5 Drawing Figures

INVENTOR.
GLEN W. SAIDLA

INVENTOR.
GLEN W. SAIDLA

MOLD CAPABLE OF BEING OPENED AND CLOSED

This invention relates generally to molding apparatus and more specifically to a mold capable of being closed to form a cavity within which a foamed-in-place article may be formed.

A mold according to this invention has use in providing a peripheral surface in which a foamed-in-place article, for example made from closed cell foamed polyurethane resin, can be formed. A mold according to this invention can readily be used in the process disclosed in my co-pending United States Patent Application Ser. No. 139,427.

In most molds used to form articles, such as, for example, containers, boats and the like (reference is made to U.S. Pat. Nos. 2,993,822 and 3,080,267) the outer or inner mold is of one piece construction and is removed from the formed article by direct movement, so that no peeling effect is obtained between the walls of the molds and the formed article. Accordingly, there is a tendency to tear out portions of the formed article during mold removal.

The mold of the instant invention provides a bottom, a pair of side and a top wall, all of which when removed from an article formed therein, move away from the article with a peeling action which has been found to reduce the tendency to tear out portions of the formed article. The mold of this invention is provided with at least one inlet opening in the bottom through which the plastic resin may be introduced to the mold cavity and is provided with a plurality of vent openings in the top wall through which gases may vent and a modest amount of resin overflow may take place to insure filling of the mold.

It is an object of this invention to provide a mold consisting of bottom, side and top walls which may be closed to form a peripheral enclosure.

It is another object of this invention to provide a mold having peripheral walls, wherein the walls, upon being opened to remove an article formed therein, move away from the article with a peeling action.

Other and further objects of this invention will become apparent upon consideration of the following description and the accompanying drawings, wherein.

Figure 1:
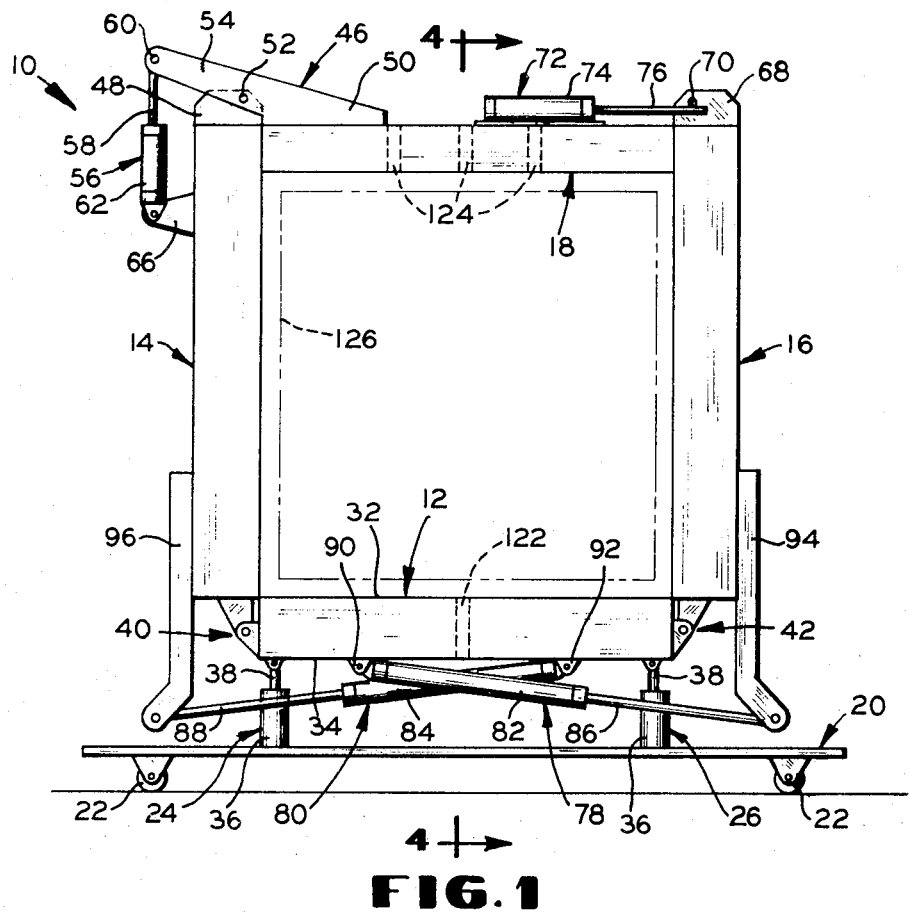
FIG. 1 is an end elevational view of a mold according to this invention.

Referring now to FIGS. 1-4 of the drawings, a mold is shown generally at 10 and includes a bottom wall or floor 12, left and right side walls 14 and 16 respectively, a top wall 18 and a mold support 20.

The mold support 20, which may be movably supported by means of a plurality of wheels 22, includes a plurality of floor supporting members 24, 26, 28 and 30 which are carried by the mold support 20 and support the floor 12. The bottom wall 12 has an upper horizontally disposed surface 32 and a lower horizontally disposed surface 34. The support members 24–30 may take the form of a suitable jacket type device and as shown in the drawings are hydraulic type jacks. The cylinder portion 36 of each support member is carried by and suitably secured to the mold support, with the piston rod portion 38 projecting upwardly therefrom. The piston rod portion 38 of support members 24 and 28 being pivotally connected to the lower surface 34 of the floor 12 adjacent its left side, while the piston rod portion 38 of support members 26 and 30 being pivotally connected to the lower surface 34 of the floor 12 adjacent its right side.

The left and right walls 14 and 16 are hinged to the bottom wall 12 by a plurality of longitudinally spaced hinges 40 and 42 respectively, and in the closed position of the mold 10, as seen in FIG. 1, project vertically upwardly from the bottom wall 12 so that the inner surface of the walls 14 and 16 are at right angles with respect to and closely abut the upper surface 32 of the floor 12.

The top wall 18 is disposed between the side walls 14 and 16 and, when the mold 10 is closed, the lateral edges of the top wall sealingly abut the inner surfaces of the side walls.

A pair of longitudinally spaced hinge means shown generally at 46 hinge the top wall to the side wall 14. The hinge means 46 includes a first bracket 48 secured to the top of and projecting upwardly from the wall 14 and a second bracket 50 which is secured to the top surface of the top wall 18 at a location rightwardly of the left edge thereof, which second bracket is pivotally connected to the bracket 48 by a pivot pin 52. The second bracket 50 includes a lever portion 54 which extends outward of the bracket 48 and a power means in the form of a hydraulic actuator 56 has the outer end of a piston rod portion 58 thereof pivotally secured at 60 to the outward end of the lever portion 54. The lower end of a cylinder 62 of the hydraulic actuator 56 is pivotally secured at 64 to a bracket 66 secured to the outer surface of the side wall 14. When the piston rod 58 is moved into the cylinder 62, the second bracket 50 urges the top wall 18 to pivot about pivot pin 52 in an upward or open direction, while when the piston rod 58 is urged to its outer position, the top wall is pivoted in a downward or closed position.

The right wall 16 has a pair of longitudinally spaced, upwardly extending brackets 68 secured to the top thereof, with each bracket carrying a longitudinally extending short rod 70. A pair of hydraulic actuators 72 have the power cylinder portion 74 thereof secured to the top surface of top wall 18 and positioned such that when the piston rod portion 76 thereof is extending, it engages under a rod 70 to prevent upward movement of the wall 18.

As seen in FIG. 1, a pair of side wall hydraulic actuators 78 and 80 is disposed below the lower wall 12; a second pair of like actuators (see FIGS. 2 and 4) also is disposed at the opposite end of the container 10. The actuators 78 and 80 include a hydraulic cylinder portion 82 and 84, respectively, and a piston rod portion 86 and 88, respectively. The left end of the cylinder 82 is pivotally connected to the lower surface 34 of the bottom wall 12 adjacent the left side thereof by means of a clevis and pin assembly 90 secured to the wall 12, while the right of the cylinder 84 is pivotally connected to the lower surface 34 of the bottom wall 12 adjacent the right side thereof by means of a clevis and pin assembly 92 secured to the wall 12. The outboard end of the piston rod 86 is pivotally connected to the lower end of a dog leg shaped, vertically extending lever arm 94, the upper portion of the arm being fixedly secured, as by welding, to the lower portion of the wall 16. The outboard end of the piston rod 88 is pivotally connected to the lower end of a dog leg shaped, vertically extending lever arm 96, the upper portion of the arm 96 being fixedly secured to the lower portion of the wall 14.

Figure 3:
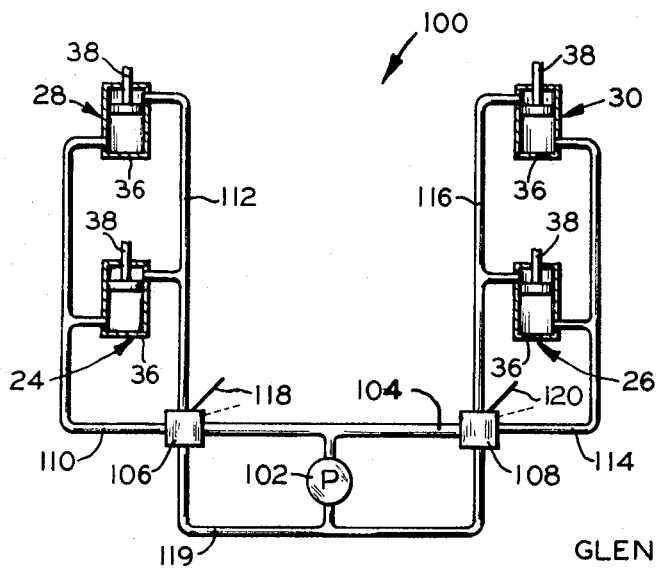
FIG. 3 is a diagrammatic view of the floor support members and the control system therefor.
Figure 2:
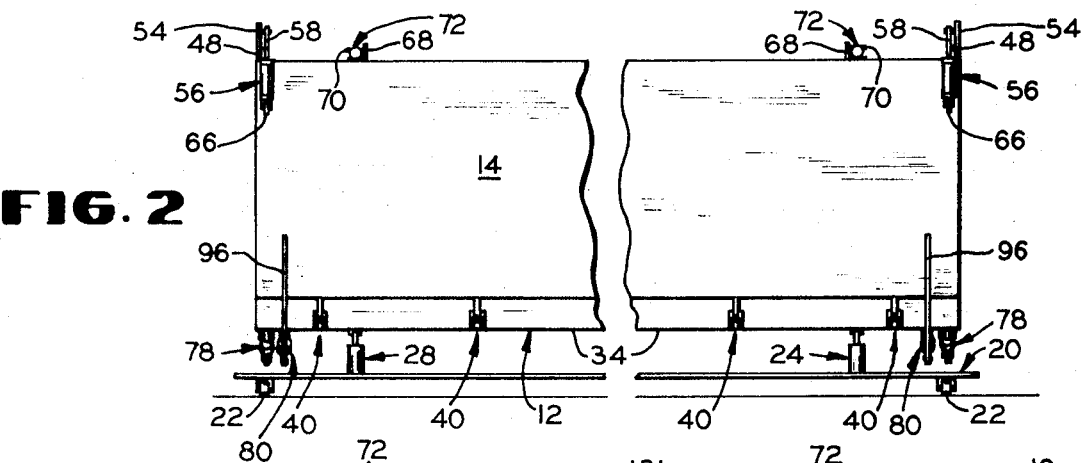
FIG. 2 is a side elevational view of the mold according to FIG. 1 when viewed from the left.

Referring now to FIG. 3, a control system for operating the floor support members 24, 26, 28 and 30 is shown generally at 100. The output of a hydraulic pump 102 is connected to a manifold supply line 104 which leads to the inlet side of each of a pair of control valves 106 and 108. The valve 106 has a first line 110 leading to the cylinders 36 of the support members 24 and 28, and entering the cylinders adjacent the lower ends thereof and a second line 112 leading to these cylinders and entering the cylinders adjacent the upper ends thereof. The valve 108 has a first line 114 leading to the cylinders 36 of the support members 26 and 30, and entering the cylinders adjacent the lower ends thereof and a second line 116 leading to these cylinders and entering the cylinders adjacent the upper ends thereof. A return line 119 connects both of the valves 106 and 108 to the input side of the pump 102.

When the levers 118 and 120 of the valves 106 and 108 are moved to the position shown in FIG. 3, pressurized hydraulic fluid is provided in the first lines 110 and 114 and enters the lower side of the cylinders 36 of support members 24, 26, 28 and 30 to force the piston rods 38 to their extended position; during this time, valves 106 and 108 connect the second lines 112 and 116 to the return line 119 to drain the upper portion of the cylinders 36. When the levers 118 and 120 are moved clockwise to the position shown in dotted lines, the second lines 112 and 116 are provided with hydraulic fluid while the first lines 110 and 114 are connected to the return line 119 and the piston rods 38 are forced downwardly to their retracted position. When the levers 118 and 120 are centralized between the solid and dotted line positions, lines 110 and 112, 114 and 116 are blocked.

The bottom wall 12 is provided with at least one inlet opening 122 through which material, such as polyurethane foam, can be introduced while the top wall 18 is provided with a plurality of vent openings 124 from which gases and excess foam material can be vented. Suitable closure means, not shown, closed by either automatic or manual means, can be provided for the vent openings 124.

OPERATION

Commencing with the mold 10 in the closed position, as seen in FIG. 1, the power cylinder 74 is activated to withdraw the piston rod 76 thereof from its engagement under the rod 70. The hydraulic actuator 78 is then activated to move the piston 86 thereof inwardly of the cylinder 82 and the right wall 16 is pivoted clockwise about the hinge 42 to its open position; it being understood that this pivoting need continue only until the wall 16 has moved away, with a peeling movement, from an article within the mold 10, but that it can continue until the wall 16 is at least horizontal.

The hydraulic actuator 56 is then actuated to cause the piston rod 58 thereof to move into the cylinder 62, which pivots the top wall 18 counter-clockwise about the hinge means 46, this pivoting movement need only be sufficient to peelingly move the wall 18 away from an article within the mold 10. After the wall 18 has moved upwardly, the hydraulic actuator 80 is actuated to cause the piston rod 88 thereof to move into the cylinder 84, and this causes the left wall 14 to pivot counter-clockwise about the hinges 40 to its open position, such movement need only be sufficient to peelingly move the wall 14 away from an article within the mold 10.

The article within the mold, if it was not previously supported, i.e., by a mandrel or the like, is now supported by suitable means. The level 118 is now moved clockwise causing the piston rods 38 of support members 24 and 28 to move downwardly thereby peelingly moving the left side of the bottom wall 12 away from the article within the mold while the bottom wall pivots slightly about the support members 26 and 30. When the bottom wall has peelingly separated from the article within the mold, the lever 120 is moved clockwise causing the piston rods 38 of support members 26 and 30 to move downwardly to their lowered position. As the bottom wall 12 moves downwardly, the hinges 40 and 42, carrying the side walls 14 and 16, move downwardly therewith. If the side wall 16 has been moved to a horizontal position, the mold support 20 can now be rolled on wheels 22 out from under the article which was formed in the mold, it being understood that the mold can remain stationary and the article removed from above the mold.

To close the mold 10 in preparation for forming an article therein, the levers 118 and 120 are moved counter-clockwise and the bottom wall 12 is moved to its upper position by the support members 24, 26, 28 and 30. The actuator 80 is now energized to extend the piston rod 88 to pivot the side wall 14 clockwise about the hinges 40 until it is upright. The actuator 56 is then energized to extend the piston rod 58 to pivot the top wall 18 clockwise about the hinge 46 until it is horizontal. The actuator 78 is then energized to extend the piston rod 86 to pivot the side wall 16 counter-clockwise about the hinges 42 until it is upright. The actuators 72 are then energized to extend the piston rods 76 until the latter are engaged under the rods 70. All the actuators are maintained energized to keep their pistons extended thereby to maintain the mold 10 in condition to have an article formed therein.

Figure 4:
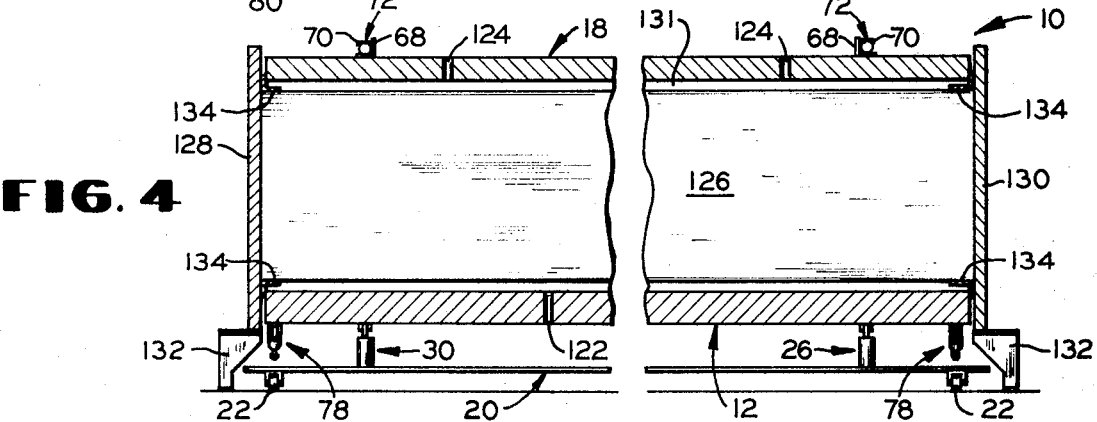
FIG. 4 is a cross-sectional view, on a reduced scale, taken along the line 4—4 of FIG. 1 with a mandrel shown in place of the mold.

Referring now to FIG. 4, the lower and upper walls 12 and 18 are shown in section, and a mandrel 126, which is rectangular in transverse cross section, is shown disposed in the mold 10. The mandrel 126 is supported by a pair of opposed annular disks 128 and 130, such that the walls of the mandrel are spaced from the walls of the mold to form a cavity 131 therebetween. Each disk 128 or 130 is supported by a pair of floor mounted pedestals 132, only one of each pair being shown in the drawing, with the height of the pedistals being adjusted so that the mandrel is spaced from the floor sufficiently to allow the mold support 20 to be rolled on its wheels 22 beneath the mandrel 126. A right angled flange 134, which is rectangular when seen in transverse cross section, is mounted on each end of mandrel 126, circumscribing its periphery and the upstanding leg of the flanges 134 abut and slightly overlap the outer edge of the walls 18 and 12 of the mold 10, as seen in FIG. 4, and are in a like relationship with the side walls 14 and 16. Accordingly, the flanges 134 form a dam at each end of the mold 10 so that when material, such as foamed polyurethane resin is introduced through the opening 122, it will fill the cavity 131, while the cavity 131 is vented through the openings 124.

SECOND EMBODIMENT

Figure 5:
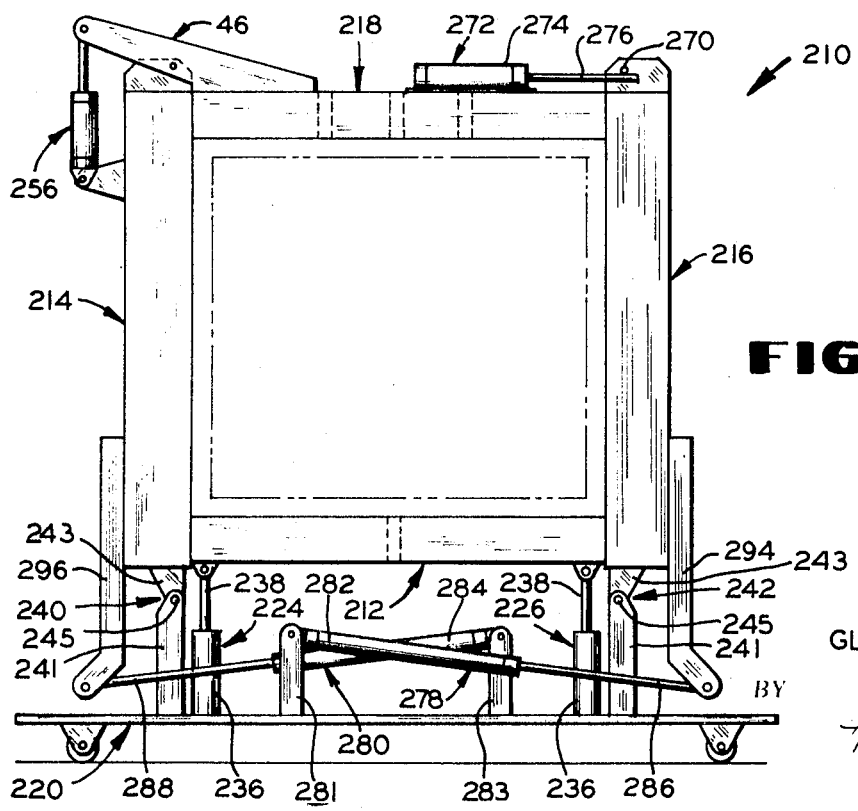
FIG. 5 is a view similar to FIG. 1 of another embodiment of this invention.

Referring to FIG. 5, which shows another embodiment of this invention, the mold 210 includes a bottom wall 212, left and right side walls 214 and 216 and a top wall 218. The relationship of the top wall 218 to the side walls 214 and 216 is the same as that in the embodiment of FIGS. 1–4.

A mold support, as shown generally at 220, includes a plurality of bottom wall supporting members 224 and 226 (two additional supporting members at the opposed end of the mold 10 are directly behind the members 224 and 226) which are carried by the mold support 220 and are pivotally connected to and support the bottom wall 212. The cylinder portion 236 of each support member is suitably secured to the support 220 with the piston rod portion 238 extending therefrom to pivotally connect to the bottom wall 212.

The side walls 214 and 216 are pivotally secured to the mold support 220 by means of plurality hinges 240 and 242, respectively. The hinges 240 and 242 each includes lower portion 241 securely connected to the support member 220 and projecting rearwardly therefrom and an upper portion 243 secured to the bottom of the side walls 214 and 216 depending therefrom; the portions 241 and 243 being connected by a hinge pin 245.

The lateral sides of the bottom wall 212 sealingly fit between the inner surface of the side walls 214 and 216, and the vertical position thereof, at such time as the mold is closed and ready for an article to be formed therein, may be adjusted by the supporting members 224 and 226 (and the other supporting members not shown). This provides an advantage over the embodiment of FIGS. 1–4 in that articles of various heights may be formed with the mold 210.

A pair of hydraulic actuators 278 and 280 are disposed between the bottom wall 212 and the mold support 220. A pair of brackets 281 and 283 are secured to the mold support 220 to the left and right of the longitudinal centerline thereof, respectively, and project upwardly therefrom. The actuators 278 and 280 include, respectively, a hydraulic cylinder 282 and 284 and also include, respectively, piston rods 286 and 288. The left end of the cylinder 282 is pivotally secured to the top of the bracket 281 while the right end of the cylinder 284 is pivotally secured to the top of the bracket 283. The outer ends of piston rods 286 and 288 are pivotally secured to the lower ends of dog leg shaped lever arms 294 and 296, respectively, with the upper portion of the lever arms being secured to the lower portion of the side walls 216 and 214, respectively. A control system, such as seen in FIG. 3, is provided to actuate the support members 224 and 226.

OPERATION

To open the mold 210 from the closed condition shown in FIG. 5, the actuator 272 on the top wall 218 is energized to withdraw its piston rod 276 from under a rod 270 carried by the right side wall 216. The actuator 278 is actuated to peelingly pivot the side wall 216 to a horizontal position. The actuator 256 is actuated to peelingly pivot the top wall 218 upwardly and then the actuator 280 is energized to peelingly pivot the left side wall 214 counterclockwise to its open position.

The support member 224, and the support member directly behind the same (not shown) are energized to peelingly lower the left side of the bottom wall 212 after which the support member 226, and the support member directly behind the same (not shown) are energized to lower the right side of the bottom wall 212.

To close the mold, the support members 224 and 226 are energized to raise the lower wall to the desired height, at which time the levers 118 and 120 of the control system 100 are centralized. Actuator 280 is energized to pivot wall 214 upright, then actuator 256 is energized to pivot wall 218 to its horizontal position, then actuator 278 is energized to pivot the wall 216 upright and finally actuator 272 is energized to extend piston rod 276 to engage under rod 270.

Having described the preferred embodiments of this invention, I claim:

1. A mold comprising, a bottom wall, a pair of side walls and a top wall, support means for supporting said bottom wall and for moving said bottom wall in a vertically downward direction in a differential and peeling manner relative to an article formed within the mold, first hinge means for mounting said side walls relative to said bottom wall and for enabling the side walls to pivot outwardly to an open position in a peeling manner relative to an article formed within the mold and to pivot to a vertical closed position, and second hinge means pivotally mounting said top wall to one of said side walls for enabling said top wall to pivot upwardly to an open position in a peeling manner relative to an article formed in the mold and, when said one side wall is disposed vertically, to pivot to a close horizontal position.

2. A mold according to claim 1 wherein said first hinge means connect said side walls to said bottom walls.

3. A mold according to claim 1 wherein said first hinge means connect said side walls to said support means.

4. A mold according to claim 1 wherein said supporting means includes a plurality of vertically movable supports and actuating means for said supports, said actuating means being operable to move some of said vertically movable supports downwardly in advance of the other of said vertically movable supports whereby said bottom wall is moved downwardly in a peeling manner.

5. A mold according to claim 4 wherein said first hinge means connect said side walls to said bottom walls.

6. A mold according to claim 4 wherein said support means includes a support member supporting said vertically movable supports, and said first hinge means connect said side walls to said support members.

* * * * *